United States Patent
Kim et al.

(10) Patent No.: US 11,287,830 B2
(45) Date of Patent: Mar. 29, 2022

(54) CONTROL METHOD OF MULTIPURPOSE ROLLABLE MOVING DEVICE

(71) Applicants: Hyundai Motor Company, Seoul (KR); Kia Motors Corporation, Seoul (KR)

(72) Inventors: Nam Gyun Kim, Incheon (KR); Jae Suk Seo, Seoul (KR); Hong Gyun Lim, Suwon-si (KR); Joo Seon Yoo, Incheon (KR); Young A Jung, Seoul (KR); Yong Uk Seo, Seoul (KR); Kyung Ho Yoo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 275 days.

(21) Appl. No.: 16/457,417

(22) Filed: Jun. 28, 2019

(65) Prior Publication Data
US 2020/0183410 A1 Jun. 11, 2020

(30) Foreign Application Priority Data
Dec. 7, 2018 (KR) .......................... 10-2018-0157487

(51) Int. Cl.
*B62D 57/02* (2006.01)
*G05D 1/02* (2020.01)

(52) U.S. Cl.
CPC ......... *G05D 1/0246* (2013.01); *G05D 1/0291* (2013.01)

(58) Field of Classification Search
CPC .... G05D 1/0246; G05D 1/0291; Y02T 10/72; B62D 57/02; B60L 15/20; B60L 2240/42
See application file for complete search history.

(56) References Cited

U.S. PATENT DOCUMENTS

| 9,511,934 B2 | 12/2016 | Wurman et al. | |
| 2006/0184705 A1* | 8/2006 | Nakajima | H04N 5/23206 710/303 |
| 2011/0106339 A1* | 5/2011 | Phillips | G01C 21/20 701/2 |
| 2018/0288334 A1* | 10/2018 | Zhang | B62D 11/02 |

FOREIGN PATENT DOCUMENTS

| KR | 10-1151449 B1 | 6/2012 |
| KR | 10-2016-0016830 A | 2/2016 |
| KR | 10-2018-0038268 A | 4/2018 |
| WO | WO 2006/044108 A2 | 4/2006 |

* cited by examiner

*Primary Examiner* — Jeff A Burke
*Assistant Examiner* — Sihar A Karwan
(74) *Attorney, Agent, or Firm* — Morgan, Lewis & Bockius LLP

(57) ABSTRACT

A control method of a multipurpose rollable moving device may include monitoring the object docked at a docking portion, a docking portion and a driving device; identifying the object mounted on a mounting portion through an identifier element; determining whether or not a camera is mounted; determining whether or not a current mode is an object following mode when the camera is mounted; recognizing a following object when the current mode is the object following mode; determining a distance and a direction to the object; and executing a driving control and a posture control through the driving device depending on the distance and direction to the object.

8 Claims, 12 Drawing Sheets

CONTROL METHOD OF MULTIPURPOSE ROLLABLE MOVING DEVICE

CROSS-REFERENCE TO RELATED APPLICATION

The present application claims priority to Korean Patent Application No. 10-2018-0157487 filed on Dec. 7, 2018, the entire contents of which is incorporated herein for all purposes by this reference.

BACKGROUND OF THE INVENTION

Field of the Invention

The present invention relates to a multipurpose rollable moving device. More particularly, the present invention relates to a control method of a multipurpose rollable device configured for rolling by self-propelling in all directions with mounting a smart device and the like.

Description of Related Art

Recently, it has been used in various fields such as transporting objects by use of a flying object such as a drone or acquiring an image by mounting a camera on a drone, but since such a drone is a flying object, it cannot be used on the ground and its utilization is limited.

Accordingly, a self-propelling moving device configured for freely moving the object to a desired place by appropriately mounting the object on the ground has been developed and provided, for example, there is Korean Patent Publication No. 10-2016-0016830 entitled "multipurpose rollable moving device".

The technology may include a self-propelling drive system inside a spherical wheel, and a payload space for mounting small objects inside a spherical wheel, so that a small object is mounted inside a spherical wheel and driven by the self-propelling drive system to transport objects.

However, since the payload space is provided inside the limited spherical wheel, the technology is limited in its usability because of the limited of types of objects to be mounted.

Therefore, it has become necessary to develop a self-propelling mobile device which may be used in a wide range that can carry various types of objects, regardless of the size and type of objects.

Thus, the present applicant has filed a patent application No. 2016-0129163 for a multipurpose rollable moving device, and the present invention is directed to providing an effective control method for the multipurpose rollable moving device.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a control method of a multipurpose rollable moving device configured for moving easily in all directions regardless of the terrain shape on the ground, carrying various kinds of objects irrespective of the size and type of objects, and having versatility such as being able to utilize it as a smart mobility A control method of a multipurpose rollable moving device according to an exemplary embodiment including a sphere driving wheel member, a driving device having four omnidirectional wheels mounted inside the driving wheel member to apply torque to the driving wheel member and disposed at a same gap in a circumferential direction and a drive motor providing a driving torque to each omnidirectional wheel, a docking portion mounted inside the driving wheel member and generating a magnetic force, and a mounting portion being attached on a surface of the driving wheel member by the magnetic force of the docking portion and having an identifier element identifying an object mounted thereon, may include monitoring the object docked at the docking portion, the docking portion and the driving device; identifying the object mounted on the mounting portion through the identifier element; determining whether or not a camera is mounted; determining whether or not a current mode is an object following mode when the camera is mounted; recognizing a following object when the current mode is the object following mode; determining a distance and a direction to the object; and executing a driving control and a posture control through the driving device depending on the distance and direction to the object.

Updating various sensor information; and executing a driving control and the posture control for a fail-safe braking and terminating the control method when the monitoring, the updating and the identifying the object by the identifier element are not achieved, may further included.

When the camera is determined not to be mounted as a result of determining whether or not the camera is mounted, determining driving torque limitation and posture control sensitivity depending on the docking object; updating steer input information through wireless communication; and executing the driving control and the posture control through the driving device, may further included.

Executing the driving control and the posture control for the fail-safe braking and terminating the control method when the updating of the steer input information through the wireless communication is not achieved, may further included.

Determining driving torque limitation and posture control sensitivity depending on the docking object; updating steer input information through wireless communication; and executing the driving control and the posture control through the driving device, when the current mode is not the object following mode, may further included.

Determining driving torque limitation and posture control sensitivity depending on the docking object; updating steer input information through wireless communication; and executing the driving control and the posture control through the driving device, after changing the current mode to a steer mode when the recognizing of the following object is not achieved, may further included.

Executing the driving control and the posture control for fail-safe braking; and terminating the control method, when the updating of the steer input information is not achieved through the wireless communication, may further included.

The driving device may rotate two adjacent omnidirectional wheels in a clockwise direction and rotate two other adjacent omnidirectional wheels in a counterclockwise direction to linearly move the driving wheel member in all directions.

The driving device may rotate only two adjacent omnidirectional wheels disposed at 180 degrees to each other among of the four omnidirectional wheels to linearly move the driving wheel member in all directions.

The driving device may move the driving wheel member along a curved line or rotate in place by variably controlling a driveshaft of each omnidirectional wheel while rotating the four omnidirectional wheels in a same direction thereof.

In accordance with the control method of the multipurpose rollable moving device according to an exemplary embodiment of the present invention, it is possible to move in all directions by rotating a spherical driving wheel member by driving a plurality of omnidirectional wheels, and easily move regardless of the shape of the terrain by moving according to the rolling motion of the driving wheel member.

It is possible to mount and carry various kinds of objects regardless of the size and type of the object through the mounting portion detachably coupled to the docking portion from the outside of the driving wheel member through magnetic force.

Since a person directly sits on the mount portion or sits in the chair by mounting an appropriate seating means such as a chair, and then can move, it is possible to utilize it as a smart mobility. Also, by mounting a camera and smart device, it is possible to shoot a disaster scene or rescue site which is difficult for people to access, and by mounting rescue equipment and apparatus, it is possible to move disaster and rescue sites to directly do or assist disaster and rescue activities.

Furthermore, it may be used for exercise such as fitness and health care of an individual, utilized for a moving means such as a personal assistant robot, and utilized in a wide range such as being able to actively utilize it for play or education of a child.

The control methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
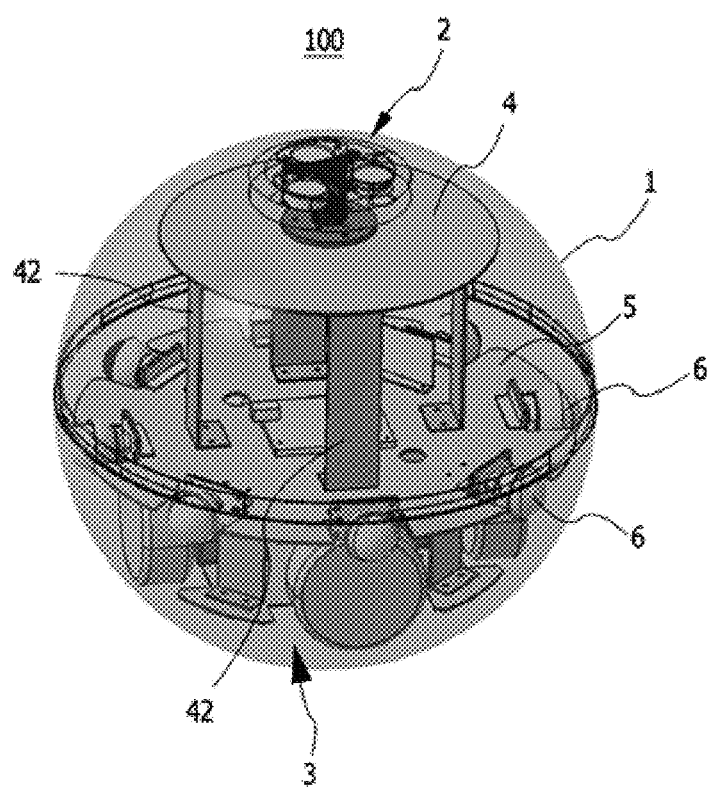
FIG. 1 is a perspective view of a multipurpose rollable moving device to which an exemplary embodiment of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment of the present invention will be described in detail with reference to accompanying drawings.

Referring to FIG. 1, a multipurpose rollable moving device 100 to which an exemplary embodiment of the present invention is applied may include a spherical driving wheel member 1.

The driving wheel member 1 may preferably be formed of a non-magnetic material, and a storage space of a predetermined size may be formed inside the driving wheel member 1.

A docking portion 2 may be mounted at the top portion of the storage space of the driving wheel member 1, and a driving device 3 may be mounted at the bottom thereof.

The docking portion 2 may be mounted on a first mounting plate 4 with a substantial disc shape, a second mounting plate 5 with a substantial disc shape may be mounted in a substantial center of the storage space of the driving wheel member 1, and the first mounting plate 4 may be connected to the second mounting plate 5 through a plurality of bridges 42, so that the docking portion 2 may be supported above the second mounting plate 5 through the first mounting plate 4 and the bridges 42.

Figure 2:
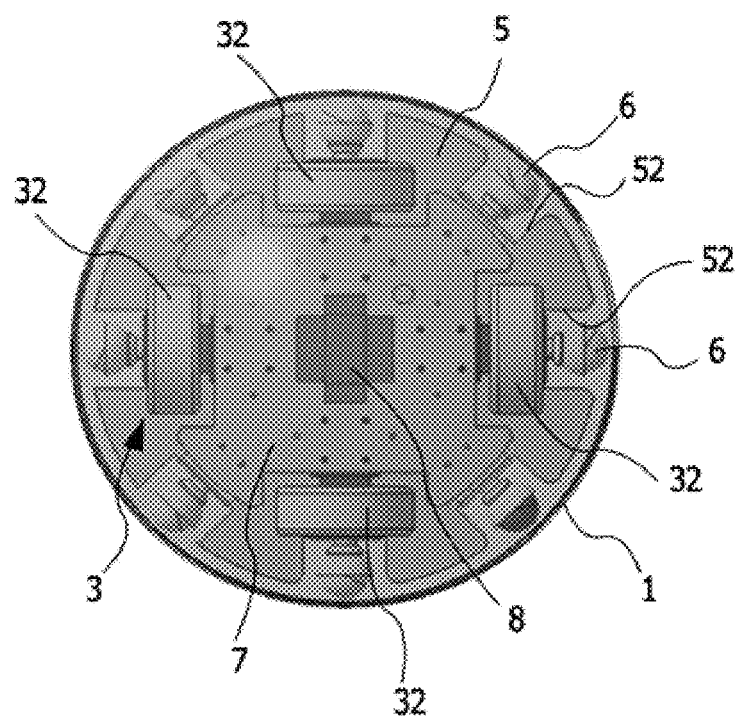
FIG. 2 is a bottom view of the multipurpose rollable moving device to which the exemplary embodiment of the present invention is applied.

Referring to FIG. 2, a plurality of receiving grooves 52 may be formed at a predetermined gap along the circumferential direction of the second mounting plate 5, and a ball caster 6 may be accommodated in each receiving groove 52.

The ball caster 6 prevents interference with the second mounting plate 5 when the driving wheel member 1 rotates and rolls, and supports the driving wheel member 1 to be rotated with respect to the second mounting plate 5.

A third mounting plate 7 may be mounted below the second mounting plate 5, and the driving device 3 may be mounted at and supported by the third mounting plate 7.

Furthermore, a battery pack 8 may be mounted on the center portion of the lower surface of the third mounting plate 7, and the battery pack 8 may supply power to the driving device 3 and may be charged from the outside.

The battery pack 8 may be located at the bottom portion of the driving wheel member 1 and act as a mass center.

Figure 3:
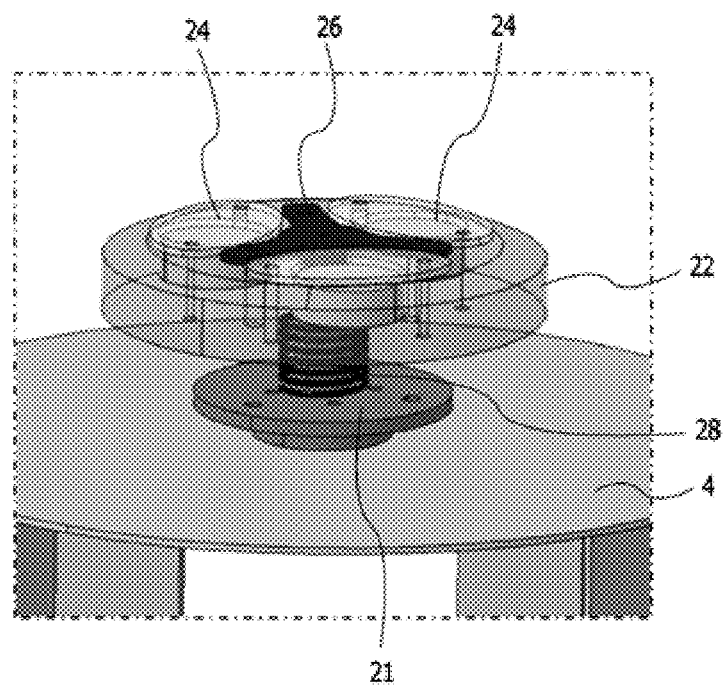
FIG. 3 is a perspective view of a docking portion of the multipurpose rollable moving device to which the exemplary embodiment of the present invention is applied.

Referring to FIG. 3, the docking portion 2 may include a docking housing 22, a plurality of magnetics 24 mounted at an upper portion of the docking housing 22, a support shaft 26 which the docking housing 22 is inserted into and supported by, and a spring 28 as an elastic member for elastically supporting the support shaft 26.

A lower portion of the support shaft 26 may be inserted into a fourth mounting plate 21 of a circular plate shape, and the fourth mounting plate 21 may be mounted with the first mounting plate 4 via bolts and the like.

The magnetics 24 may preferably be permanent magnets, but replaced with electromagnet if need. In the exemplary embodiment of the present invention, the magnetics 24 may have the configuration that three magnetics are mounted in a circumferential direction at a predetermined gap but two or more magnetics may be mounted.

Figure 4:
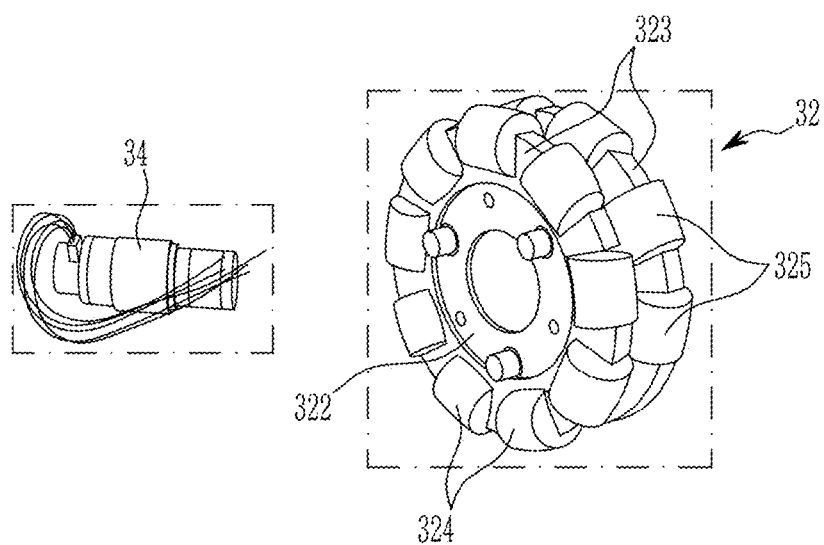
FIG. 4 is an exploded perspective view of a driving device of the multipurpose rollable moving device to which the exemplary embodiment of the present invention is applied.

Referring to FIG. 4, the driving device 3 may include a plurality of known omnidirectional wheels 32 and a drive motor 34 coupled to the omnidirectional wheel 32 to drive the omnidirectional wheels 32.

The omnidirectional wheel 32 may include two wheel housings 322 and 323 having a disk shape and a plurality of first and second rollers 324 and 325 rotatably mounted to each wheel housing 322 and 323.

The two wheel housings 322 and 323 may be mounted in an axial direction thereof to form two layers housing.

A plurality of first rollers 324 may be mounted at the first wheel housing 322 at a predetermined gap in a circumferential direction thereof, and a plurality of second rollers 325 may be mounted at the second wheel housing 323 at a predetermined gap in a circumferential direction thereof.

Furthermore, each of the second rollers 325 may be mounted between the plurality of first rollers 324 in the circumferential direction thereof.

Also, although not shown in detail, each omnidirectional wheel 32 may be provided with an encoder to detect the rotation speed of the omnidirectional wheel 42.

Referring to FIG. 2, again, the plurality of omnidirectional wheels 32 may be mounted by four at an angle of 90 degrees in the circumferential direction thereof.

When each omnidirectional wheel 32 receives the torque through the drive motor 44 to rotate, each roller of the omnidirectional wheel 32 rotates and The driving wheel member 1 closely contacted with the rollers receives the rotational force through each of the rollers and rotates to roll.

If controlling the operation of each drive motor 34 of each omnidirectional wheel 32, the driving wheel member 1 can rotate in place and roll in all directions.

Figure 5:
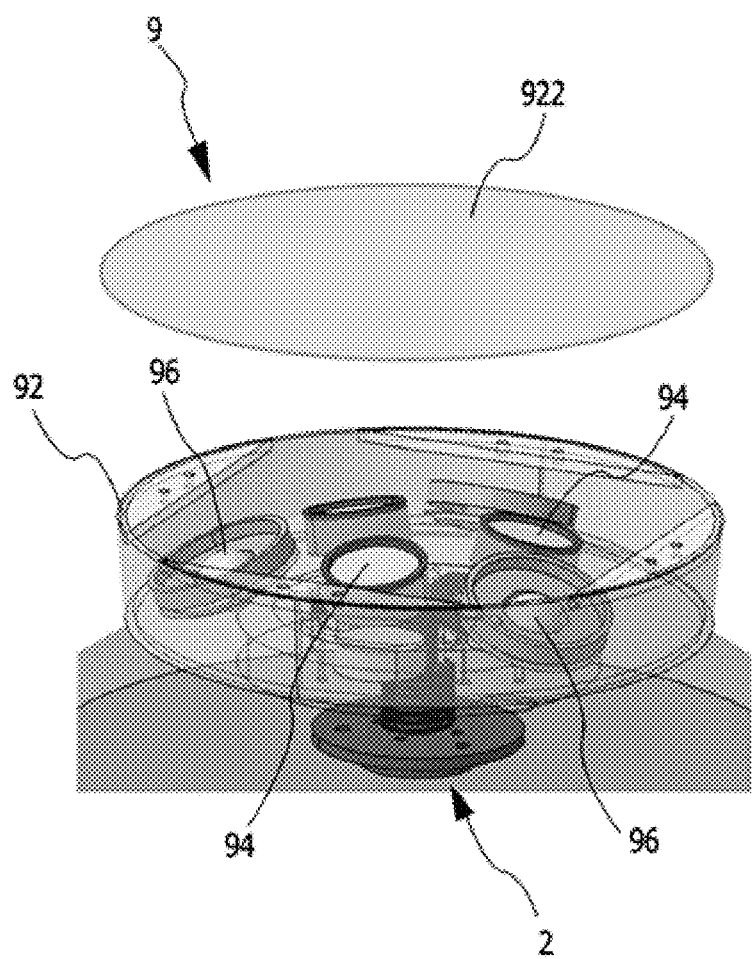
FIG. 5 is a perspective view of a mounting portion of the multipurpose rollable moving device to which the exemplary embodiment of the present invention is applied.

Referring to FIG. 5, the multipurpose rollable moving device may further include a mounting portion 9 detachably coupled to the docking portion 2.

Since the mounting portion 9 is mounted on a surface of the driving wheel member 1 and coupled with the docking portion 2 through magnetic force, the mounting portion 9 can always be located at the top portion of the driving wheel member 1 as long as the docking portion 2 maintains its position even if the driving wheel member 1 rolls.

The mounting portion 9 may include a mounting housing 92 of a substantial circular plate, a plurality of magnetics 94 accommodated inside the mounting housing 92 and interacts with the magnetics 24 of the docking portion 2, and a plurality of ball casters 96 mounted on a lower surface of the mounting housing 2 and contacted with a surface of the driving wheel member 1 to prevent friction with the mounting housing 92 when the driving wheel member 1 rotates.

The plurality of magnetics 94 may use electromagnet or permanent magnet.

Various objects may be mounted on a flat mounting plate 922 forming the upper surface of the mounting housing 92.

For example, it is possible to mount a smart device such as a smart phone or a navigation device to move it, mount a camera and take pictures of the surroundings, and mount various devices and equipment to move it. Also, it is possible to utilize the wide range for various purposes such as allowing a person to sit on a chair by mounting the chair or the like or sitting directly on the mounting portion and utilize it as a personal moving means.

Figure 6:
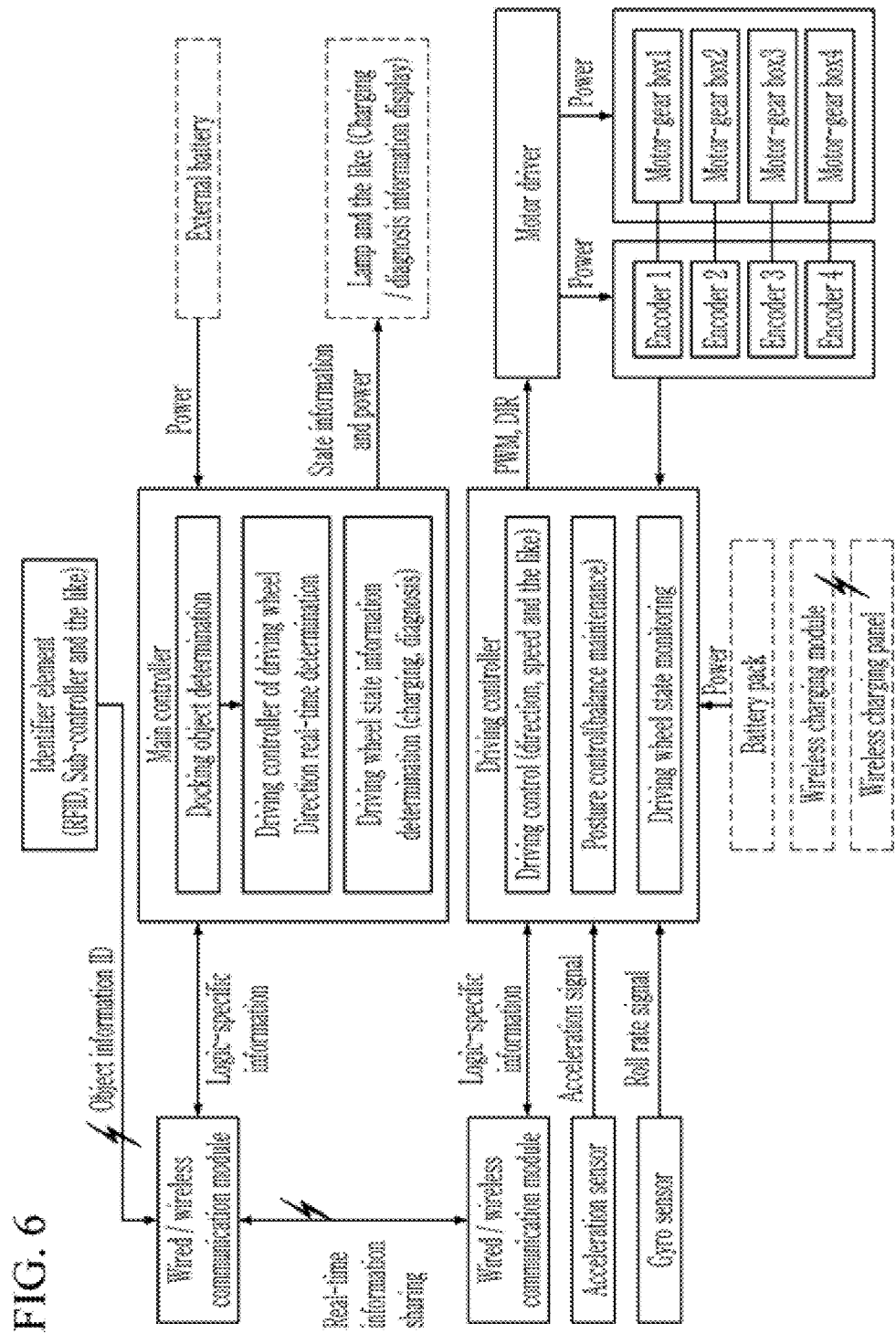
FIG. 6 is a drawing explaining a control method of a multipurpose rollable moving device according to the exemplary embodiment of the present invention.

Referring to FIG. 6, in the mounting portion 9, an identifier element may be disposed to identify the mounted object.

As the identifier element, for example, an RFID or the like may be utilized.

A sub-controller, etc., may be embedded in the mounting portion 9 to identify the mounted object via the identifier element and to transmit the identified object identification information.

When using the plurality of magnetics 94 as an electromagnet, the sub-controller can control the magnitude of the magnetic force of electromagnet to control the mounting posture of the object mounted on the mounting portion 9.

A main controller may be installed at the second mounting plate 5.

The main controller can identify the mounted object by receiving the information related to the mounted object by the identifier element or sub-controller and the wired/wireless communication module. (docking object determination)

If the camera is mounted on the driving wheel member, the surrounding situation of the driving wheel member 1 is determined through the camera image, and based on the present judgment, the driving control direction may be determined as real time.

Furthermore, the main controller may be connected to the battery pack 8 to determine and diagnose the state of the driving wheel member 1, for example, the state of charge of the battery pack 8.

A driving controller may be mounted at the third mounting plate 7 at which the driving device 3 is mounted.

The driving controller is connected to a motor driver of the drive motor 34 to control the drive speed (PWM control) and drive direction (DIR control) of the drive motor 34. At the instant time, the rotation speed of the drive motor 34 may be determined through the encoder and feedback may be performed.

Furthermore, an acceleration sensor and a gyro sensor may be mounted on the driving wheel member 1, and the driving controller may be configured to control the drive motor by determining the rolling moving speed and rotation speed and the like of the rolling wheel 1 of the driving wheel member 1 through an acceleration sensor and control the posture of the drive wheel 1 to be balanced by determining roll rate signal through the gyro sensor.

The drive controller may communicate with the main controller through the wired/wireless communication module to share information in real time.

A wireless charging module may be embedded in the battery pack 8.

Figure 7:
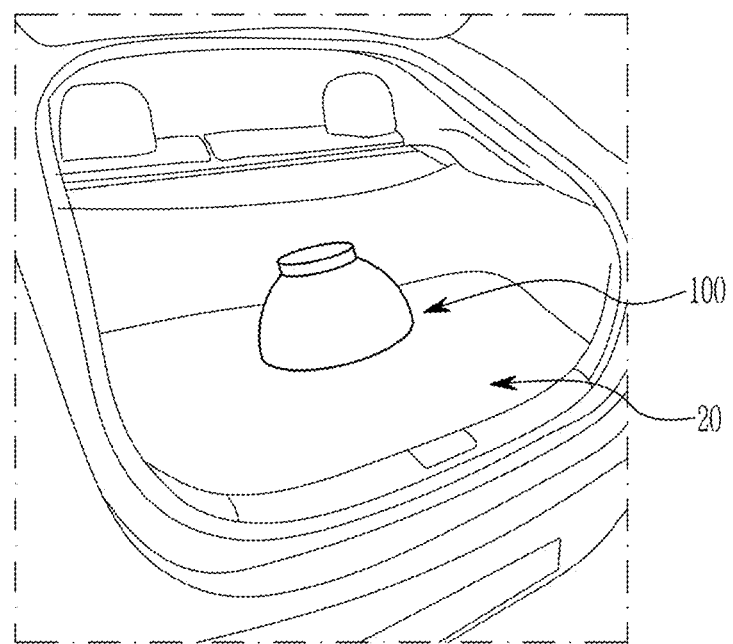
FIG. 7 is a drawing explaining a state where the multipurpose rollable moving device to which the exemplary embodiment of the present invention is applied is accommodated inside a vehicle and charged.

Furthermore, the battery pack 8, as shown in FIG. 7, may be stored in the trunk compartment 20 of the vehicle to be moved through the vehicle, and the battery pack 8 may be charged by wireless communication with the wireless charging panel of the vehicle in a state which is stored in the trunk compartment 20.

Figure 8:
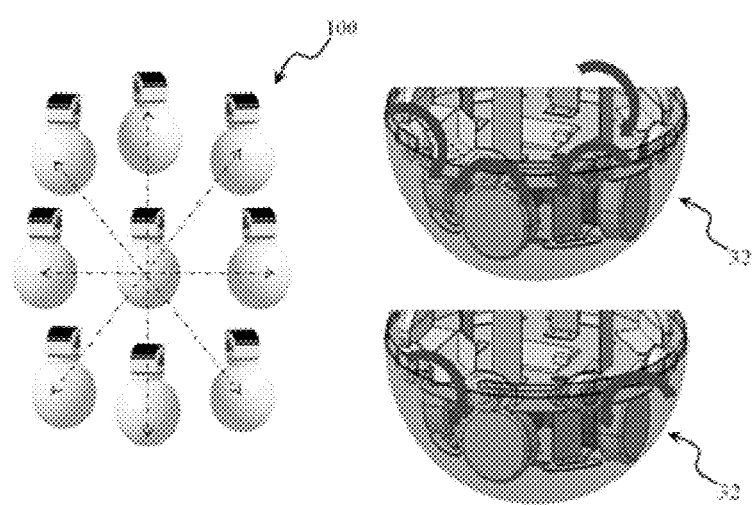
FIG. 8 is an explanatory diagram for controlling the driving device of the multipurpose rollable moving device to which the exemplary embodiment of the present invention is applied to linearly move it in all directions.

Referring to FIG. 8, in the case that the plurality of omnidirectional wheels 32 are mounted by four at an angle of 90 degrees in a circumferential direction thereof, the driving controller may linearly move the multipurpose rollable moving device 100 in all directions by rotating two adjacent omnidirectional wheels 32 in a clockwise direction and two other adjacent omnidirectional wheels 32 in an anticlockwise direction thereof.

Unlike this, the driving controller may linearly move the multipurpose rollable moving device 100 in all directions by rotating only the two omnidirectional wheels 32 located at 180 degrees out of the four omnidirectional wheels 32 in opposite directions to each other.

Figure 9:
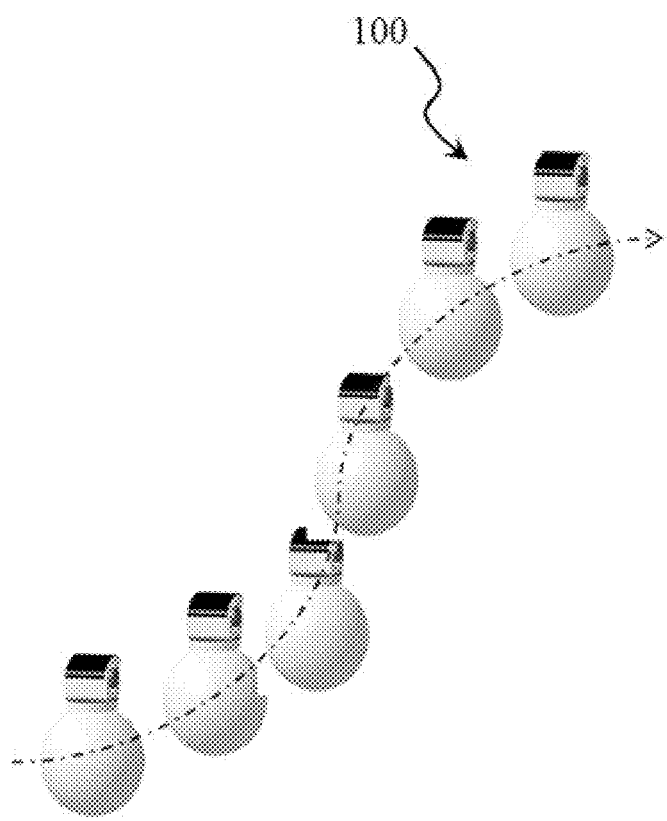
FIG. 9 is an explanatory diagram for controlling the driving device of the multipurpose rollable moving device to which the exemplary embodiment of the present invention is applied to curve it in all directions.

Referring to FIG. 9, when the driving controller rotates four omnidirectional wheels 32 in a clockwise direction or counterclockwise direction thereof, the multipurpose rollable moving device 100 may be moved a curved line, at which time the axis of each omnidirectional wheel 32 is variably controlled in real time.

Figure 10:
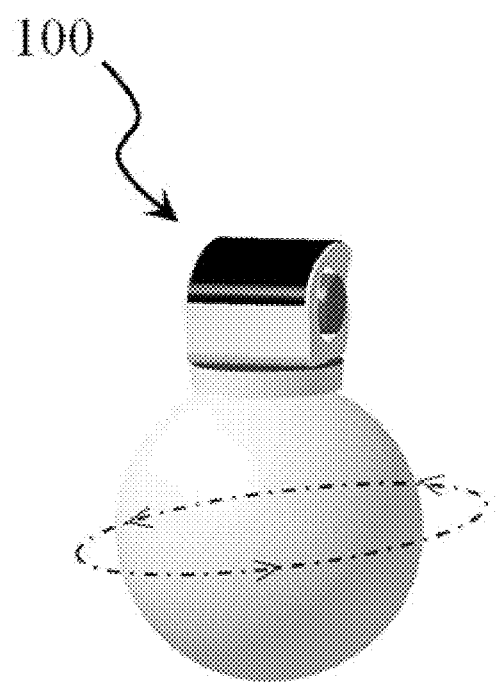
FIG. 10 is an explanatory diagram for controlling the driving device of the multipurpose rollable moving device to which the exemplary embodiment of the present invention is applied to rotate it in place.
Figure 11A:
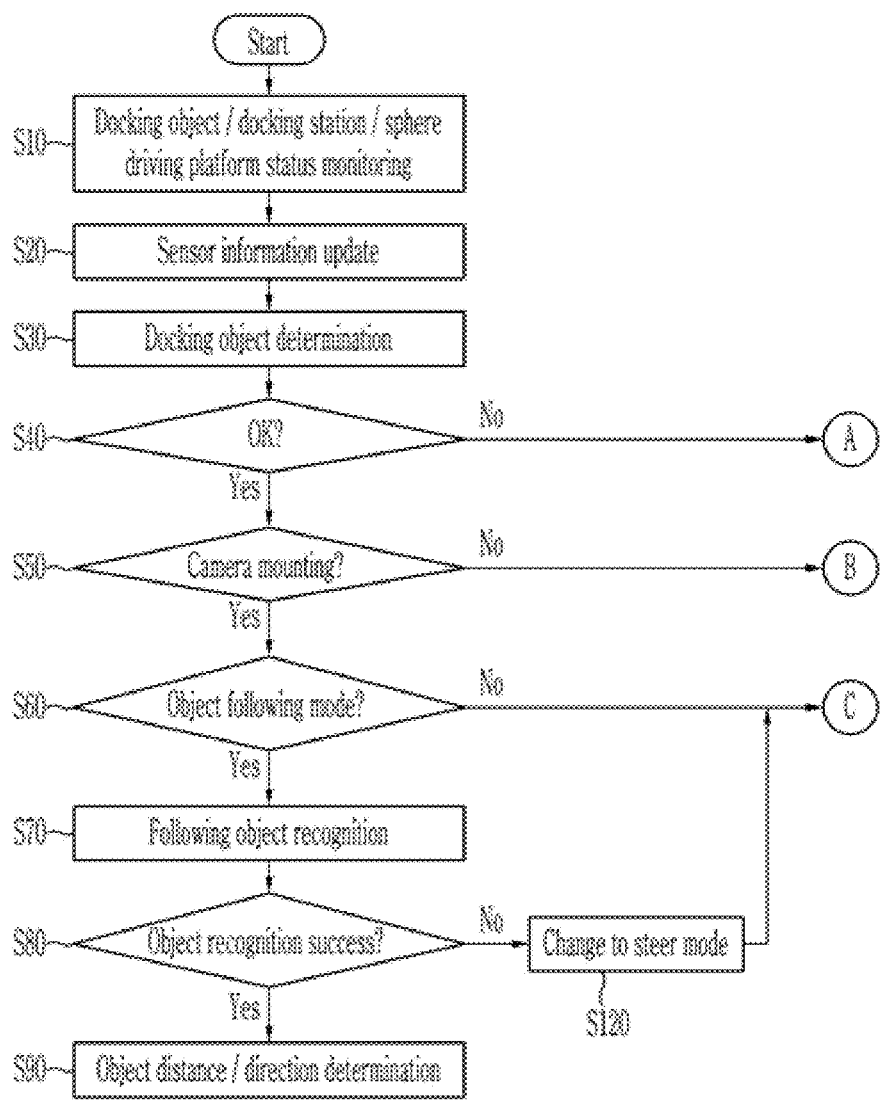
FIG. 11A and FIG. 11B are flowcharts of a control method of a multipurpose rollable moving device according to the exemplary embodiment of the present invention.
Figure 11B:
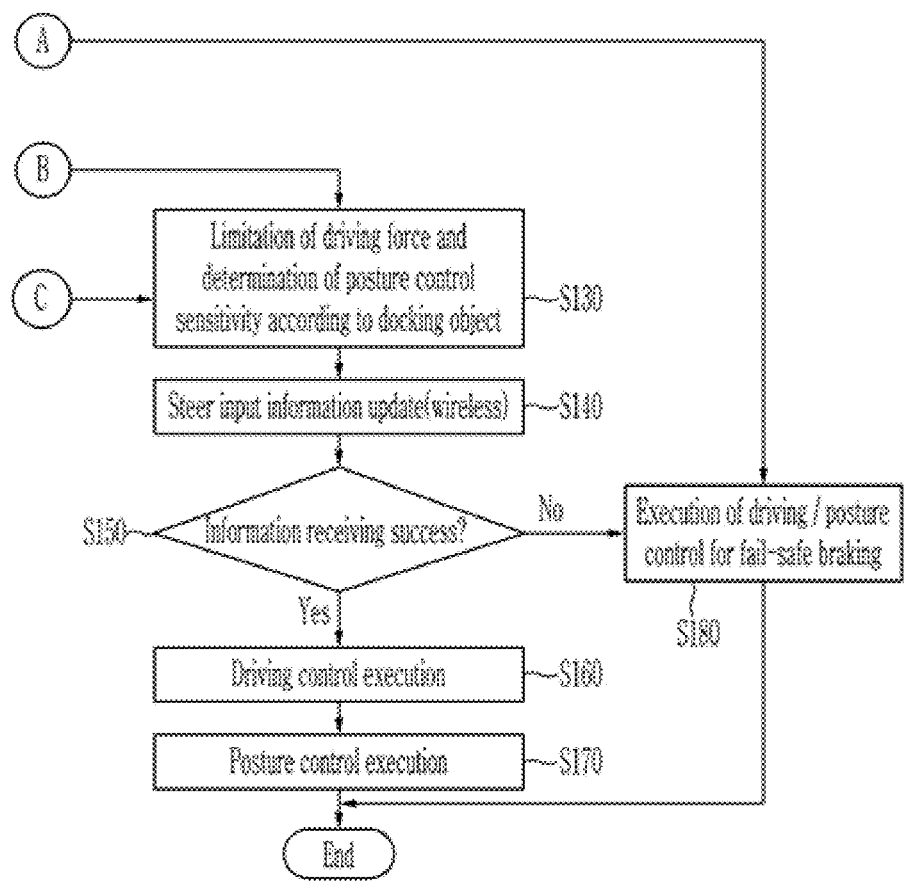

Referring to FIG. 10, when the driving controller rotates four omnidirectional wheels 32 in the same specific direction thereof, the multipurpose rollable moving device 100 can rotate in place. When the multipurpose rollable moving device 100 is accelerated/decelerated or braked, the driving controller throttle-controls each axis of the omnidirectional wheel 32, Referring to FIG. 11, a control method of a multipurpose rollable moving device an exemplary embodiment of the present invention may include, monitoring a docking object, the docking portion 2 and the driving device 3 in a step S10, updating various sensor information in a step S20, and identifying the object mounted on the mounting portion 9 in a step S30.

When the step S10 to step S30 are successfully performed, it is determined whether or not the camera is mounted in a step S40. On the other hand, if the step S10 to step S30 are not successfully performed, the process goes to a step S180 to execute driving control and the posture control for the fail-safe braking and the process end portions.

When the camera is mounted as a determination result of the step S40, it is determined whether a current mode is an object following mode in a step S60.

When the camera is not mounted, the process goes to a step S130 to determine driving torque limitation and posture control sensitivity depending on the object mounted on the mounting portion 9, updating steer input information through wireless communication in a step S140, and then, determining whether or not the information reception in the step S140 is successful in a step S150. When the information reception is successful, the driving torque control in a step S160 and the posture control in a step S170 are executed, respectively, and then, the process is ended. When the information reception is not successful, the process goes to a step S180 in which the driving control and the posture control for fail-safe braking is executed and then, the process is ended.

If it is an object following mode as a result of object following mode determination in a step S60, the following object is recognized in a step S70, and if it is not the object following mode, the steps S130 to S180 are executed and the process is terminated.

If the object recognition succeeds in a step S80 after recognizing the following object in the step S70, the distance and direction to the following object are determined in a step S90 and then, the driving control and posture control are executed in the steps S160 and S170, respectively, and the process is ended. If the object recognition does not succeed in the step S80, the current mode is changed to the steer mode in a step S120 and the steps S130 to S180 are executed, and then, the process is ended.

Such a series of control method may be programmed and stored in the main controller.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A multipurpose rollable moving device comprising:
   a sphere driving wheel member, a driving device having four omnidirectional wheels mounted inside the driving wheel member to apply torque to the driving wheel member and mounted at a same gap in a circumferential direction thereof and a drive motor providing a driving torque to each omnidirectional wheel;
   a docking portion mounted inside the driving wheel member and generating a magnetic force;
   a mounting portion being attached on a surface of the driving wheel member by the magnetic force of the docking portion and having an identifier element identifying a docking object mounted thereon;
   a sub-controller identifying the mounted object via the identifier element;
   a driving controller controlling the drive motor; and
   a main controller receiving information related to the mounted object through the sub-controller and communicating with the driving controller;
   wherein the main controller executes a series of instructions that includes:
   monitoring the docking object docked at the docking portion, the docking portion and the driving device;

identifying the docking object mounted on the mounting portion through the identifier element;
determining when a camera is mounted;
determining when a current mode is an object following mode as the camera is mounted;
recognizing a following object when the current mode is the object following mode;
determining a distance and a direction from the multipurpose rollable moving device through to the following object; and
executing a driving control and a posture control of the multipurpose rollable moving device through the driving device depending on the distance and direction to the following object,
wherein
when the camera is determined not to be mounted as a result of determining when the camera is mounted, determining driving torque limitation and posture control sensitivity depending on the docking object;
updating steer input information through wireless communication; and
executing the driving control and the posture control through the driving device, and
wherein the main controller further executes:
determining driving torque limitation and posture control sensitivity depending on the docking object;
updating steer input information through wireless communication; and
executing the driving control and the posture control through the driving device, when the current mode is not the object following mode.

2. The the multipurpose rollable moving device of claim 1, wherein the main controller further executes:
updating sensor information; and
executing a driving control and a posture control for a fail-safe braking and terminating control of the multipurpose rollable moving device when monitoring, updating and identifying of the following object by the identifier element are not achieved.

3. The multipurpose rollable moving device of claim 1, wherein the main controller further executes:
executing the driving control and the posture control for a fail-safe braking and terminating control of the multipurpose rollable moving device when the updating of the steer input information through the wireless communication is not achieved.

4. The multipurpose rollable moving device of claim 1, wherein the main controller further executes:
determining the driving torque limitation and the posture control sensitivity depending on the docking object;
updating the steer input information through the wireless communication; and
executing the driving control and the posture control through the driving device, after changing the current mode to a steer mode when the recognizing of the following object is not achieved.

5. The multipurpose rollable moving device of claim 4, wherein the main controller further executes:
executing the driving control and the posture control for fail-safe braking; and
terminating control of the multipurpose rollable moving device, when the updating of the steer input information is not achieved through the wireless communication.

6. The multipurpose rollable moving device of claim 1, wherein the driving device rotates two adjacent omnidirectional wheels of the four omnidirectional wheels in a clockwise direction and rotates two other adjacent omnidirectional wheels of the four omnidirectional wheels in a counterclockwise direction to linearly move the driving wheel member in all directions thereof.

7. The multipurpose rollable moving device of claim 1, wherein the driving device rotates two adjacent omnidirectional wheels mounted at 180 degrees to each other among of the four omnidirectional wheels to linearly move the driving wheel member in all directions thereof.

8. The multipurpose rollable moving device of claim 1, wherein the driving device moves the driving wheel member along a curved line or rotates the driving wheel member in place by variably controlling a driveshaft of each omnidirectional wheel while rotating the four omnidirectional wheels in a same direction thereof.

* * * * *